United States Patent
Wagman et al.

(10) Patent No.: US 9,722,450 B2
(45) Date of Patent: Aug. 1, 2017

(54) INDUCTIVE POWER TRANSMISSION GEOMETRY

(71) Applicant: Apple Inc., Cupertino, CA (US)

(72) Inventors: Daniel C. Wagman, Scotts Valley, CA (US); Eric S. Jol, San Jose, CA (US); Warren Z. Jones, San Jose, CA (US)

(73) Assignee: APPLE INC., Cupertino, CA (US)

( * ) Notice: Subject to any disclaimer, the term of this patent is extended or adjusted under 35 U.S.C. 154(b) by 498 days.

(21) Appl. No.: 14/322,253

(22) Filed: Jul. 2, 2014

(65) Prior Publication Data

US 2016/0006288 A1    Jan. 7, 2016

(51) Int. Cl.
*B60R 25/00*    (2013.01)
*H02J 7/02*    (2016.01)
*H01F 38/14*    (2006.01)
*H02J 5/00*    (2016.01)

(52) U.S. Cl.
CPC .............. *H02J 7/025* (2013.01); *H01F 38/14* (2013.01); *H02J 5/00* (2013.01)

(58) Field of Classification Search
CPC ..................................................... H02J 17/00
USPC ......................................................... 307/104
See application file for complete search history.

(56) References Cited

U.S. PATENT DOCUMENTS

| | | | |
|---|---|---|---|
| 2,471,869 A | 5/1949 | Gebel | |
| 3,676,814 A | 7/1972 | Trunzo et al. | |
| 4,096,535 A | * 6/1978 | Highnote | H01F 38/18 360/281.4 |
| 4,496,927 A | 1/1985 | Inoue | |
| 4,529,906 A | 7/1985 | McMahon | |

(Continued)

FOREIGN PATENT DOCUMENTS

| | | |
|---|---|---|
| EP | 0642203 | 7/1994 |
| EP | 0886363 | 12/1998 |

(Continued)

OTHER PUBLICATIONS

Author Unknown, "System Description Wireless Power Transfer," vol. 1: Lower Power, Part 1: Interface Definition, Version 1.1.2, 186 pages, Jun. 2013.

(Continued)

*Primary Examiner* — Stephen W Jackson
(74) *Attorney, Agent, or Firm* — Kilpatrick Townsend & Stockton LLP

(57) ABSTRACT

A first electronic device includes an inner inductive coil positioned at least partially around a shield core and a second electronic device includes an outer inductive coil positioned around an aperture. The first electronic device is operable to receive power from and/or transmit power to the second electronic device when a portion of the first electronic device is inserted into the aperture of the second electronic device, positioning the inner inductive coil within the aperture and within the outer inductive coil. When power is being transmitted between the first and second electronic devices, the shield core concentrates magnetic flux around the inner inductive coil and/or the outer inductive coil. In some implementations, an outer shield may be positioned at least partially around the outer inductive coil and may also concentrate magnetic flux around the inner inductive coil and/or the outer inductive coil.

20 Claims, 7 Drawing Sheets

(56) References Cited

U.S. PATENT DOCUMENTS

| | | | | |
|---|---|---|---|---|
| 5,770,936 | A | * 6/1998 | Hirai | B23Q 1/00 307/104 |
| 5,903,134 | A | * 5/1999 | Takeuchi | H02J 7/025 320/108 |
| 6,798,039 | B1 | 9/2004 | Gillespie et al. | |
| 6,798,326 | B2 | 9/2004 | Iida | |
| 6,922,128 | B2 | 7/2005 | Vilander et al. | |
| 7,197,113 | B1 | * 3/2007 | Katcha | A61B 6/032 378/101 |
| 7,432,793 | B2 | 10/2008 | Nussbaum | |
| 7,872,559 | B2 | 1/2011 | Asano | |
| 7,902,953 | B1 | 3/2011 | Watt | |
| 8,159,183 | B2 | 4/2012 | Choi et al. | |
| 8,354,821 | B2 | 1/2013 | Cheng et al. | |
| 8,421,273 | B2 | * 4/2013 | Schmidt | H01F 38/14 307/104 |
| 8,823,238 | B2 | 9/2014 | Greaves et al. | |
| 9,124,141 | B2 | * 9/2015 | Amma | H02J 5/00 |
| 9,209,627 | B2 | 12/2015 | Baarman et al. | |
| 9,312,729 | B2 | * 4/2016 | Yasuda | B60L 11/182 |
| 2015/0280442 | A1 | 10/2015 | Graham | |
| 2015/0303699 | A1 | 10/2015 | Wagman et al. | |
| 2015/0348697 | A1 | 12/2015 | Graham et al. | |

FOREIGN PATENT DOCUMENTS

| | | |
|---|---|---|
| EP | 2161811 | 3/2010 |
| EP | 2674950 | 6/2012 |
| WO | WO92/17929 | 10/1992 |
| WO | WO98/23020 | 5/1998 |
| WO | WO03/096361 | 11/2003 |
| WO | WO2004/073283 | 8/2004 |
| WO | WO2005/036569 | 4/2005 |
| WO | WO2010/129369 | 11/2010 |

OTHER PUBLICATIONS

Palany, "Power Losses in Litz Wire Used in IPT Applications," Department of Electrical and Computer Engineering, University of Auckland, Aukland, New Zealand, 9 pages, at least as early as May 30, 2014.

International Search Report and Written Opinion, PCT/US2015/037661, 11 pages, Oct. 1, 2015.

\* cited by examiner

INDUCTIVE POWER TRANSMISSION GEOMETRY

TECHNICAL FIELD

This disclosure relates generally to inductive power transmission, and more specifically to a geometry for inductive power transmission that positions an inner inductive coil within an outer inductive coil.

BACKGROUND

Electronic devices utilize power in order to operate. For example, electronic devices such as laptop computers, desktop computers, cellular telephones, smart phones, mobile computers, tablet computers, wearable devices, digital media players, electronic styluses, earphones, headsets, electronic kitchen appliances, and other such electronic devices utilize power in order to operate.

Some electronic devices may obtain power for operation and/or to store for later operation utilizing a wired connection to another electronic device and/or other power source such as an alternating current outlet. However, such a wired connection may require exposed electrical contacts and/or other exposed components that may be subject to corrosion and/or other such issues.

Other electronic devices may obtain power for operation and/or to store for later operation utilizing one or more inductive power transmission systems. In such an inductive power transmission system, a time varying current may be provided to a transmit coil that is inductively proximate to but separated from a receive coil at least by an air gap. The time varying current in the transmit coil may cause the transmit coil to create varying magnetic flux, which may induce a voltage in the receive coil by inductive coupling. In this way, power may be wirelessly transferred from the transmit coil to the receive coil.

However, the efficiency of such an inductive power transmission system may be dependent upon the inductive coupling between the transmit and receive coils. Higher losses may result the more imperfectly the transmit and receive coils are inductively coupled. Such inefficiencies may necessitate use of higher voltages and/or amplitudes in order to transmit a particular amount of power and/or may cause interference with and/or generation of heat within other proximate components through the creation of eddy currents.

SUMMARY

The present disclosure discloses systems, methods, and apparatuses for inductive power transmission. A first electronic device may include an inner inductive coil positioned at least partially around a shield core. A second electronic device may include an outer inductive coil positioned around an aperture. The first electronic device may be operable to receive power from and/or transmit power to the second electronic device when a portion of the first electronic device is inserted into the aperture of the second electronic device, positioning the inner inductive coil within the aperture and within the outer inductive coil.

In some implementations, an outer shield may be positioned at least partially around the outer inductive coil and may also concentrate magnetic flux around the inner inductive coil and/or the outer inductive coil.

In some implementations, the inner inductive coil may be positioned adjacent to a surface of the shield core. Additionally, the shield core may include one or more flanges that cover one or more additional surfaces of the inner inductive coil. Similarly, the outer inductive coil may be positioned adjacent to a surface of the outer shield and the outer shield may or may not include one or more flanges that cover one or more additional surfaces of the outer inductive coil. In other implementations, the inner inductive coil may be at least partially embedded within the shield core and/or the outer inductive coil may be at least partially embedded within the outer shield.

In one or more implementations, the shield core may include one or more cavities that may or may not extend through the shield core. In some cases, the cavity may extend all the way through the shield core and may form a port for one or more electronic devices of the first electronic device, such as an acoustic port for one or more acoustic devices. In other cases, the cavity may not extend all the way through the shield core and one or more electronic components may be positioned within the cavity.

In various implementations, the inner and outer inductive coils may be configured in complimentary shapes, such as smaller and larger circular shapes. Smaller and larger circular shaped inductive coils that nest may enable inductive power transmission with tightly coupled coils and a cylindrical magnetic flux path.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1:
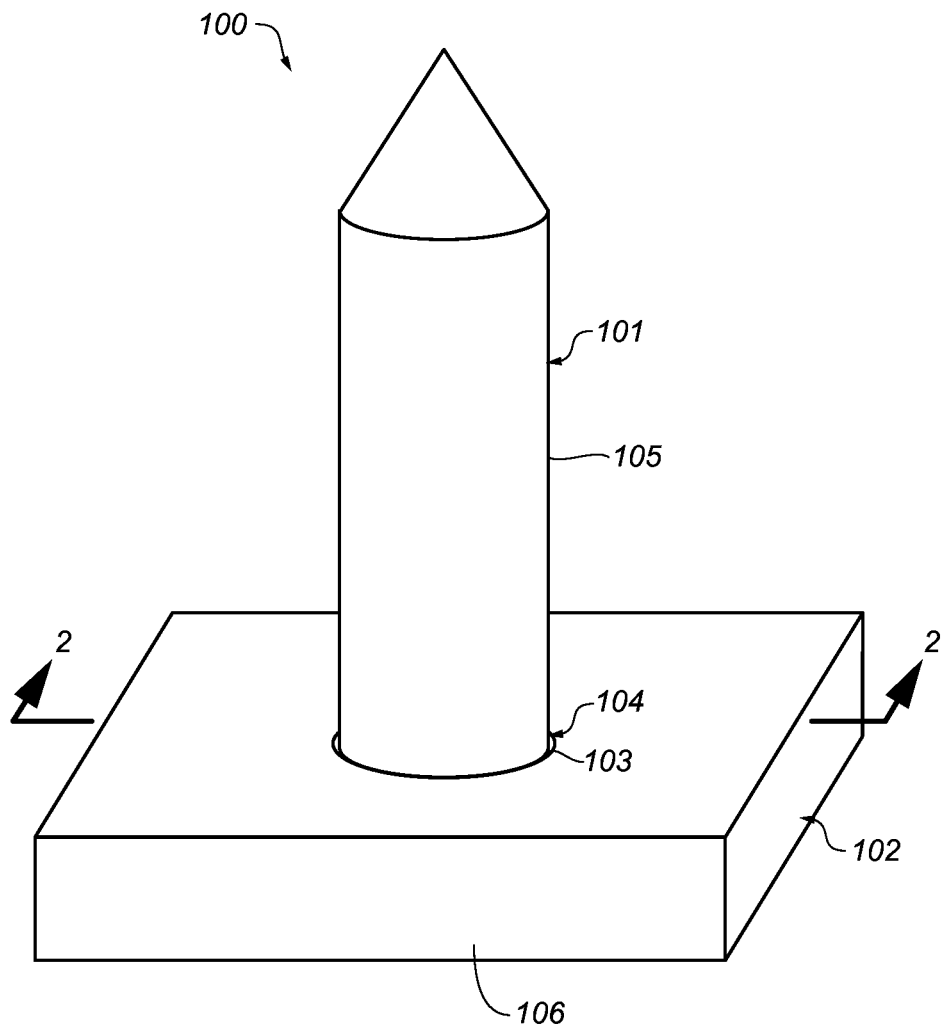
FIG. 1 is an isometric view illustrating an example system for inductive power transmission.

The description that follows includes sample systems, methods, and apparatuses that embody various elements of the present disclosure. However, it should be understood that the described disclosure may be practiced in a variety of forms in addition to those described herein.

The present disclosure discloses systems, methods, and apparatuses for inductive power transmission. A first electronic device may include an inner inductive coil positioned at least partially around a shield core and a second electronic device may include an outer inductive coil positioned around an aperture. The first electronic device may be operable to receive power from and/or transmit power to the second electronic device when a portion of the first electronic device (such as a shaft and/or other configured portion) is inserted into the aperture of the second electronic device, positioning the inner inductive coil within the aperture and within the outer inductive coil. When power is being transmitted between the first and second electronic devices, the shield core may concentrate magnetic flux around the inner inductive coil and/or the outer inductive coil. In some implementations, an outer shield may be positioned at least partially around the outer inductive coil and may also concentrate magnetic flux around the inner inductive coil and/or the outer inductive coil.

In various implementations, the shield core and/or the outer shield may be formed of at least one or more ferrite materials. In some implementations, the inner inductive coil may be positioned adjacent to a surface of the shield core. Additionally, the shield core may include one or more flanges that cover one or more additional surfaces of the inner inductive coil. Similarly, the outer inductive coil may be positioned adjacent to a surface of the outer shield and the outer shield may or may not include one or more flanges that cover one or more additional surfaces of the outer inductive coil. In other implementations, the inner inductive coil may be at least partially embedded within the shield core and/or the outer inductive coil may be at least partially embedded within the outer shield. In various implementations, the shield core and/or the outer shield may mitigate interference by magnetic flux with one or more electronic components of the first and/or second electronic device by shielding such components from the magnetic flux.

In some implementations, the outer inductive coil may be the transmit coil of an inductive power transmission system and the inner inductive coil may be the receive coil. In such a case, the shield core may collect magnetic flux generated by the transmit coil and/or the outer shield may guide such magnetic flux toward the receive coil. In some instances of such a case, power from a battery of the second electronic device may be transmitted to the first electronic device and stored in a battery of the first electronic device.

In various implementations, the inner and outer inductive coils may be configured in complimentary shapes, such as smaller and larger circular shapes. Smaller and larger circular shaped inductive coils that nest may enable inductive power transmission with tightly coupled coils and a cylindrical magnetic flux path.

In one or more implementations, the shield core may include one or more cavities that may or may not extend through the shield core. In some cases, the cavity may extend all the way through the shield core and may form an acoustic port for one or more acoustic devices (such as microphones or speakers) of the first electronic device. In other cases, the cavity may not extend all the way through the shield core and one or more electronic components (such as one or more acoustic devices) may be positioned within the cavity.

FIG. 1 is an isometric view illustrating an example system 100 for inductive power transmission. The system 100 may include a first electronic device 101 and a second electronic device 102. As shown, the first electronic device may be a stylus and the second electronic device may be a charging dock for the stylus. However, although the first electronic device is shown as a stylus and the second electronic device is shown as a stylus charging dock, it is understood that this is an example. In various implementations the first and/or second electronic device may be a desktop computer, a laptop computer, a mobile computer, a tablet computer, a smart phone, a cellular telephone, a digital media player, a wearable device, an accessory, a headset, a dock, a case, an electronic kitchen appliance, an external battery pack, an electronic personal hygiene device, and/or any other electronic device without departing from the scope of the present disclosure.

The second electronic device 102 may include a housing 106 with an aperture 103 and the first electronic device 101 may include a housing 105 with a portion 104 (shown as a shaft though it is understood that this is an example and may be otherwise configured in other implementations without departing from the scope of the present disclosure) configured to be inserted into the aperture. When so positioned, the first and second electronic device may be configured such that power is inductively transmitted from the second electronic device to the first electronic device.

Although the present disclosure is illustrated and described as inductively transmitting power from the second electronic device 102 to the first electronic device 101, it is understood that this is an example. In other implementations the first and second electronic devices may be configured such that power is inductively transmitted from the first electronic device to the second electronic device.

Figure 2:
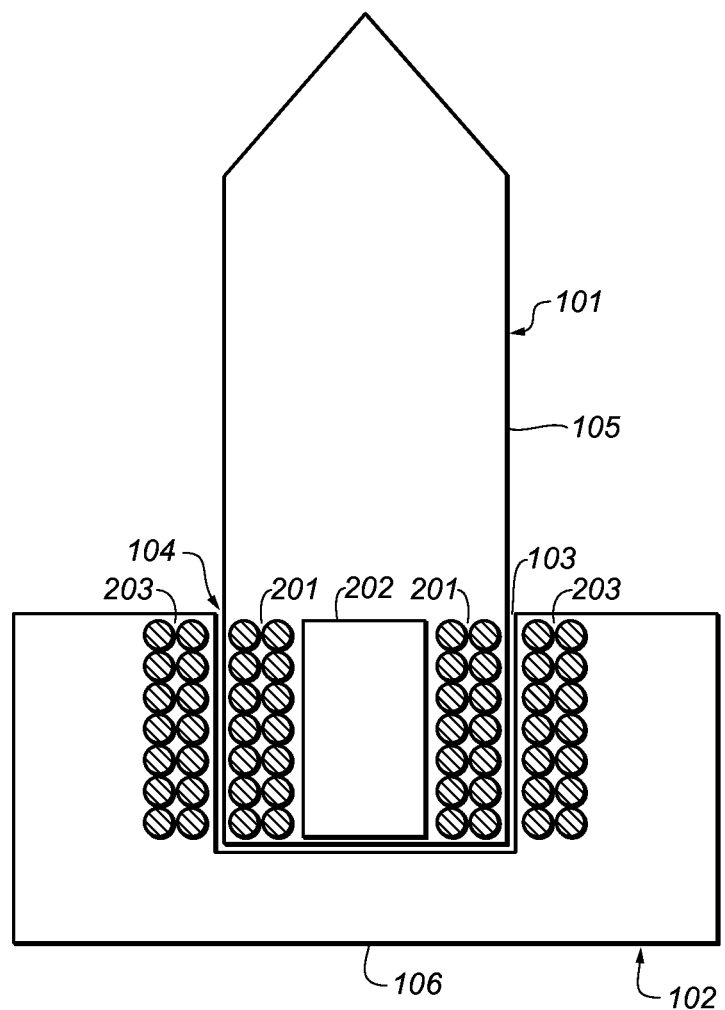
FIG. 2 is a cross sectional view of the example system of FIG. 1 taken along line 2-2 of FIG. 1 illustrating the geometry of example inductive power transmission components.

FIG. 2 is a cross sectional view of the example system 100 of FIG. 1 taken along line 2-2 of FIG. 1 illustrating the geometry of example inductive power transmission components 201-203. As illustrated, the first electronic device 101 may include an inner inductive coil 201 positioned around a shield core 202 and the second electronic device 102 may include an outer inductive coil 203 positioned around the aperture 103. As also illustrated, when the portion 104 of the first electronic device is inserted into the aperture, the inner inductive coil may be positioned within the aperture and within the outer inductive coil.

In the shown configuration, a time varying current may be provided to the outer inductive coil 203 to create a varying magnetic flux. This magnetic flux may induce a voltage in the inner inductive coil 201 by inductive coupling, wirelessly transmitting power from the second electronic device to the first electronic device by induction. However, as discussed above this is an example and in various implementations power may be inductively transmitted from the inner induction coil to the outer induction coil.

As the inner inductive coil 201 may be positioned within the outer inductive coil 203, the coils may be tightly coupled (i.e., aligned such that the coil receiving inductively transmitted power is positioned within magnetic flux generated by the coil inductively transmitting power). Tight coupling may increase efficiency and/or the power transferred as well as reduce interference and/or heat generation. As illustrated, the inner and outer inductive coils may be complementary circular shapes such that the coils are tightly coupled to guide the magnetic flux in a cylindrical path. However, it is understood that this is an example and that in various implementations the coils may be configured in shapes that are not complementary and/or not circular.

The shield core 202 may include at least a ferrite material that concentrates the magnetic flux around the inner inductive coil 201 and/or the outer inductive coil 203. The shield core may operate to collect the magnetic flux generated by the outer inductive coil. The shield core may also operate in some implementations to shield one or more electronic components of the first electronic device 101 and/or the second electronic device 102, thereby mitigating interference by the magnetic flux with such electronic components. In some implementations, the inner inductive coil may be formed by winding wire and/or similar material of the inner inductive coil around the shield core. Similarly, the outer inductive coil may be formed by winding wire and/or similar material of the outer inductive coil around an area of the housing 106 surrounding the aperture 103.

Figure 3:
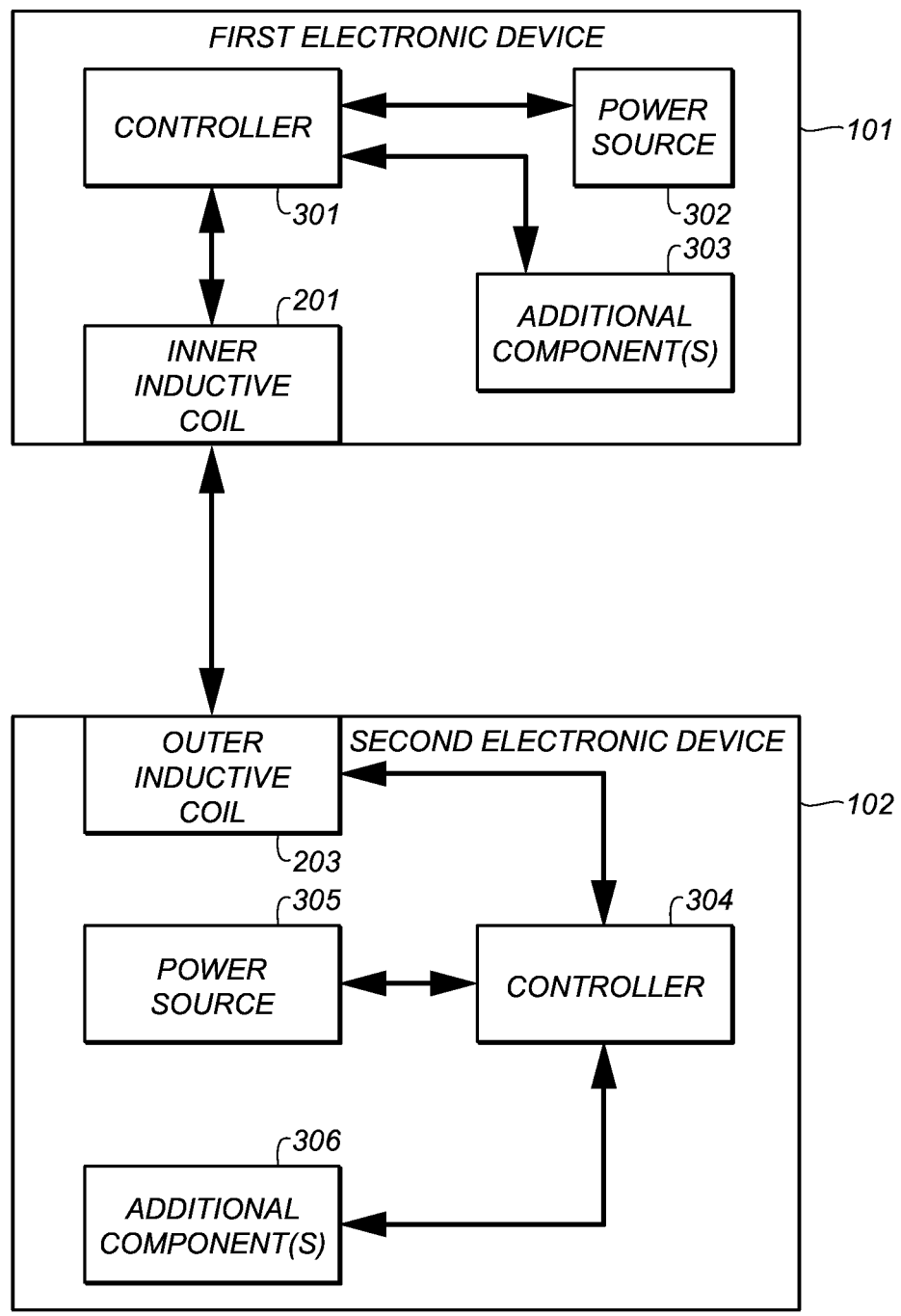
FIG. 3 is a block diagram illustrating possible relationships of example components of the example system of FIG. 1.

FIG. 3 is a block diagram illustrating possible relationships of example components of the example system 100 of FIG. 1. As illustrated, the first electronic device 101 may include one or more controllers 301 (such as one or more processing units), the inner inductive coil 201, one or more power sources 302 (such as one or more batteries, connections to one or more alternating power outlets, and so on), and/or one or more additional components 303 such as one or more non-transitory storage media (which may take the form of, but is not limited to, a magnetic storage medium; optical storage medium; magneto-optical storage medium; read only memory; random access memory; erasable programmable memory; flash memory; and so on), one or more input/output components, one or more communication components, and so on. The controller 301 may be operable to store power received through the inner inductive coil in the power source 302 and/or transmit power from the power source 302 through the inner inductive coil.

Similarly, the second electronic device 102 may include one or more controllers 304, the outer inductive coil 203, one or more power sources 305, and/or one or more additional components 306 and the controller 304 may be operable to transmit power from the power source 305 through the outer inductive coil and/or store power received through the outer inductive coil in the power source 305.

In various implementations, the second electronic device 102 may inductively transmit power from a battery of the second electronic device to the first electronic device 101, which the first electronic device may store in a battery of the first electronic device. However, it is understood that this is an example and that other implementations are possible and contemplated.

Figure 4A:
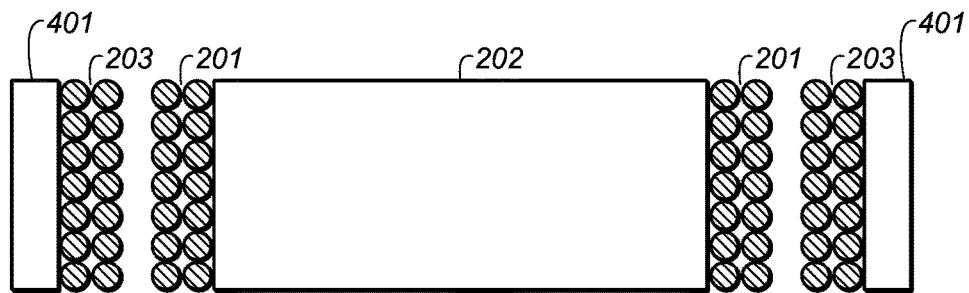
FIG. 4A illustrates a first alternative implementation of the example inductive power transmission components of FIG. 2 with the first and second electronic devices removed for clarity.

FIG. 4A illustrates a first alternative implementation of the example inductive power transmission components of FIG. 2 with the first and second electronic devices 101 and 102 removed for clarity. As contrasted with the configuration shown in FIG. 2, in some implementations an outer shield 401 may be at least partially positioned around the outer inductive coil 203.

The outer shield 401 may include at least a ferrite material that concentrates the magnetic flux around the inner inductive coil 201 and/or the outer inductive coil 203. The outer shield may operate to guide the magnetic flux generated by the outer inductive coil toward the inner inductive coil. The outer shield may also operate in some implementations to shield one or more electronic components of the first electronic device 101 and/or the second electronic device 102, thereby mitigating interference by the magnetic flux with such electronic components. In some implementations, the outer inductive coil may be formed by winding wire and/or similar material of the outer inductive coil around an inner portion of the outer shield.

Figure 4B:
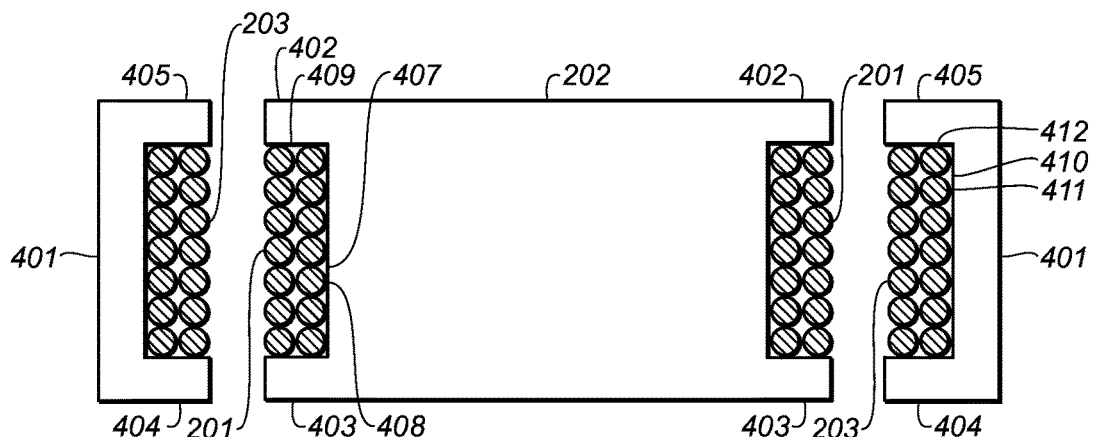
FIG. 4B illustrates a second alternative implementation of the example inductive power transmission components of FIG. 2 with the first and second electronic devices removed for clarity.

FIG. 4B illustrates a second alternative implementation of the example inductive power transmission components of FIG. 2 with the first and second electronic devices 101 and 102 removed for clarity. As contrasted with the configuration shown in FIG. 4A, in some implementations the shield core 202 and/or the outer shield 401 may include a number of flanges 402-405, respectively. As illustrated, a surface 408 of the inner inductive coil 201 may be positioned adjacent to a vertical surface 407 of the shield core and the flanges 402 and/or 403 may cover one or more horizontal surfaces 409 of the inner inductive coil. Similarly, a surface 411 of the outer inductive coil 203 may be positioned adjacent to a vertical surface 410 of the outer shield and the flanges 404 and/or 405 may cover one or more horizontal surfaces 412 of the outer inductive coil.

The flanges 402-405 may operate to further concentrate the magnetic flux around the inner inductive coil 201 and/or the outer inductive coil 203. The flanges may operate to aid in collection of the magnetic flux generated by the outer inductive coil and/or guiding the magnetic flux generated by the outer inductive coil toward the inner inductive coil. The flanges may also operate in some implementations to aid in shielding one or more electronic components of the first electronic device 101 and/or the second electronic device 102, thereby further mitigating interference by the magnetic flux with such electronic components.

Figure 4C:
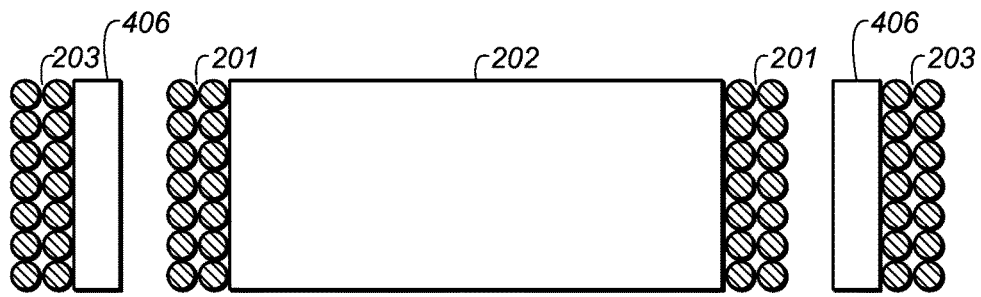
FIG. 4C illustrates a third alternative implementation of the example inductive power transmission components of FIG. 2 with the first and second electronic devices removed for clarity.

FIG. 4C illustrates a third alternative implementation of the example inductive power transmission components of FIG. 2 with the first and second electronic devices removed for clarity. As contrasted with the configuration shown in FIG. 2, in some implementations the outer inductive coil may be positioned around a bobbin 406, which may be formed of plastic and/or other such non-ferrite material. In such implementations, the outer inductive coil may be formed by winding wire and/or similar material of the outer inductive coil around the plastic bobbin.

Figure 4D:
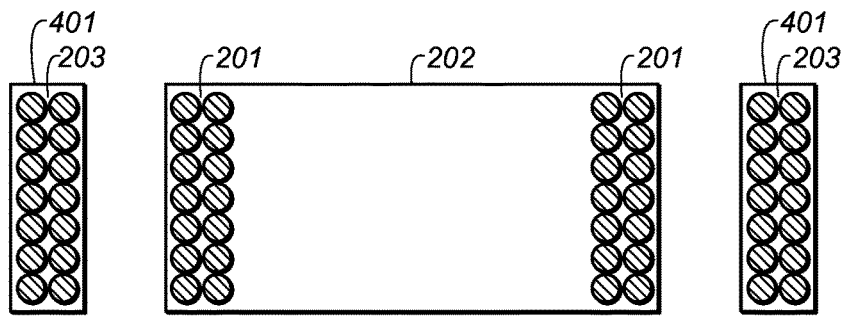
FIG. 4D illustrates a fourth alternative implementation of the example inductive power transmission components of FIG. 2 with the first and second electronic devices removed for clarity.

FIG. 4D illustrates a fourth alternative implementation of the example inductive power transmission components of FIG. 2 with the first and second electronic devices removed for clarity. As contrasted with the configuration shown in FIG. 4A, in some implementations the inner inductive coil 201 may be at least partially embedded within the shield core 202 and/or the outer inductive coil 203 may be at least partially embedded within the outer shield 401.

Figure 5A:
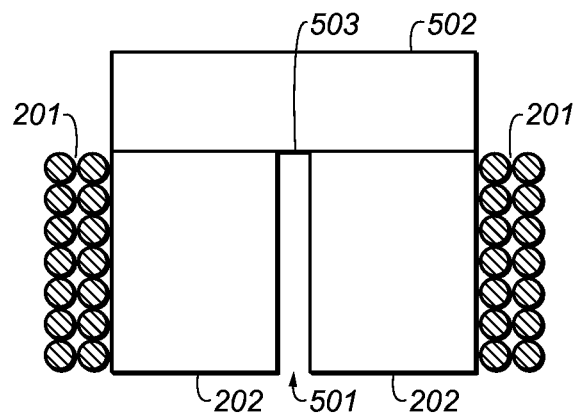
FIG. 5A illustrates a first alternative implementation of the inner inductive coil and shield core of FIG. 2 with the first and second electronic devices and the outer inductive coil removed for clarity.

FIG. 5A illustrates a first alternative implementation of the inner inductive coil 201 and shield core 202 of FIG. 2 with the first and second electronic devices 101 and 102 and the outer inductive coil 203 removed for clarity. As contrasted with the configuration shown in FIG. 2, in some implementations the shield core may include a cavity 501 that extends through the shield core. An electronic component 502 may be coupled to the shield core. A port 503 of electronic component may be aligned with the cavity.

For example, the electronic component 502 may be an acoustic component (such as a microphone, speaker, and/or other acoustic component) with an acoustic aperture 503 that aligns with the cavity 501. In such a case, the cavity may form an acoustic port for the acoustic component.

Figure 5B:
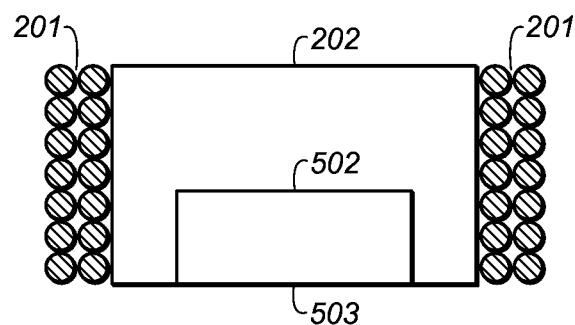
FIG. 5B illustrates a second alternative implementation of the inner inductive coil and shield core of FIG. 2 with the first and second electronic devices and the outer inductive coil removed for clarity.

FIG. 5B illustrates a second alternative implementation of the inner inductive coil 201 and shield core 202 of FIG. 2 with the first and second electronic devices 101 and 102 and the outer inductive coil 203 removed for clarity. As contrasted with the configuration shown in FIG. 5A, in some implementations a cavity within the shield core may not extend entirely through the shield core and one or more electronic components 502 may be positioned therein.

Figure 6:
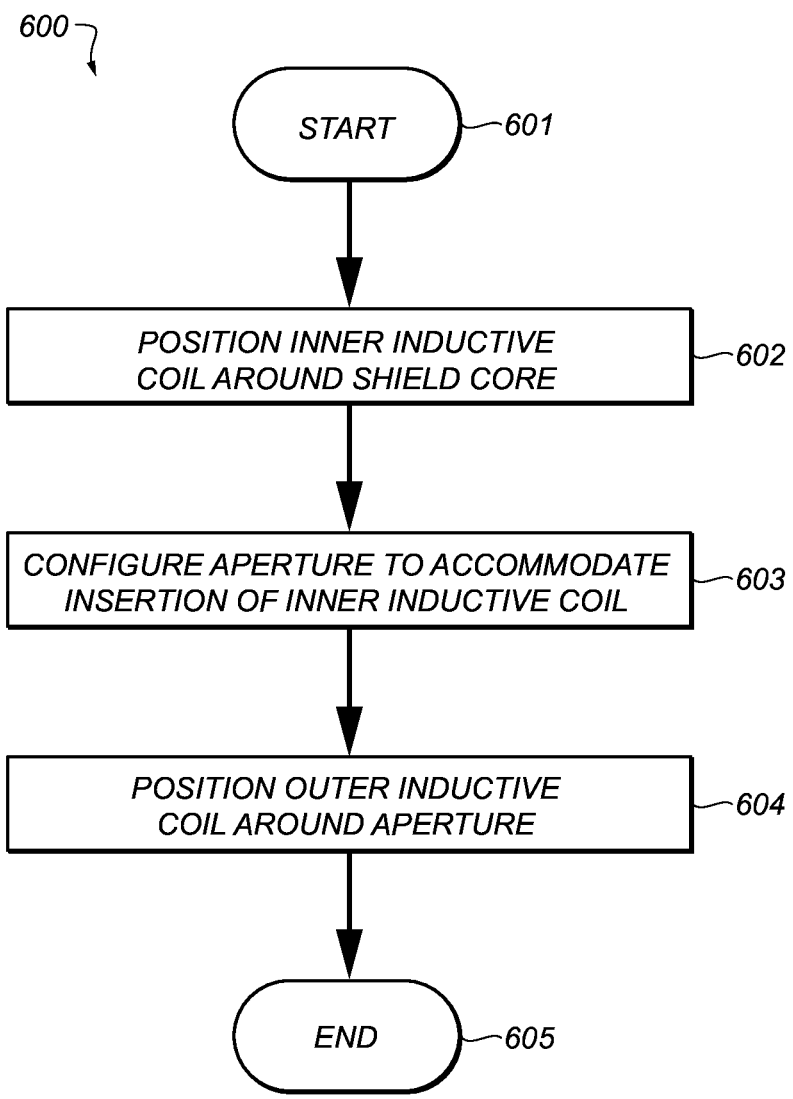
FIG. 6 is a flow chart illustrating a method for assembling an inductive power transmission system. This method may assemble the example systems of FIGS. 1-5B.

FIG. 6 is a flow chart illustrating a method 600 for assembling an inductive power transmission system. This method may assemble the example systems of FIGS. 1-5B.

The flow may begin at block 601 and proceed to block 602 where an inner inductive coil is positioned around a shield core. The flow may then proceed to block 603 where an aperture is configured to accommodate insertion of the inner inductive coil. Next, the flow may proceed to block 604 where an outer inductive coil is positioned around the aperture. Finally, the flow may proceed to block 605 and end.

Although the method 600 is illustrated and described above as including particular operations performed in a particular order, it is understood that this is an example. In various implementations, various orders of the same, similar, and/or different operations may be performed without departing from the scope of the present disclosure For example, block 603 is illustrated and described as configuring the aperture to accommodate insertion of the inner inductive coil. In some implementations, the inner inductive coil may be incorporated into a portion of an electronic device such as a shaft and/or other configuration and configuration of the aperture to accommodate insertion of the inner inductive coil may include configuration of the aperture to accommodate insertion of the portion of the electronic device.

Figure 7:
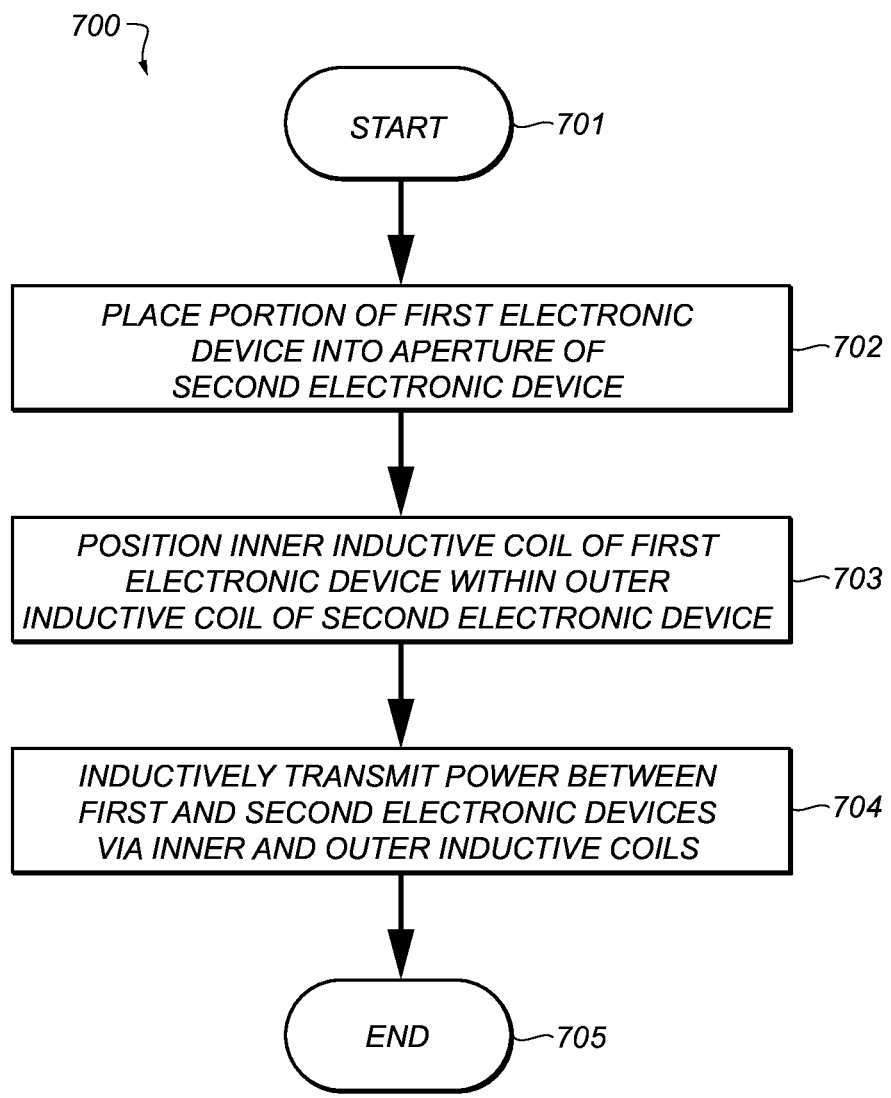
FIG. 7 is a flow chart illustrating a method for inductively transmitting power. This method may be performed utilizing the example systems of FIGS. 1-5B.

FIG. 7 is a flow chart illustrating a method 700 for inductively transmitting power. This method may be performed utilizing the example systems of FIGS. 1-5B.

The flow may begin at block 701 and proceed to block 702 where a portion of a first electronic device is placed into an aperture of a second electronic device. The flow may then proceed to block 703 where an inner inductive coil of the first electronic device is positioned within an outer inductive coil of the second electronic device. Next, the flow may proceed to block 704 where power is inductively transmitted between the first and second electronic devices via the inner and outer inductive coils.

In some cases, the outer inductive coil may function as a transmit coil that inductively transmits power to the inner inductive coil, which may function as a receive coil. In other cases, the inner inductive coil may function as a transmit coil that inductively transmits power to the outer inductive coil, which may function as a receive coil.

Finally, the flow may proceed to block 705 and end.

Although the method 700 is illustrated and described above as including particular operations performed in a particular order, it is understood that this is an example. In various implementations, various orders of the same, similar, and/or different operations may be performed without departing from the scope of the present disclosure For example, though the operations of placing the portion of the first electronic device into the aperture at block 702 and positioning the inner inductive coil within the outer inductive coil at block 703 are shown and described above as separate linear operations, it is understood that this is an example. In some implementations, these operations may be performed simultaneously as part of a single, unified operation. In other implementations, the operations of positioning the inner inductive coil within the outer inductive coil may be a sub operation that may be performed when performing the operation of placing the portion of the first electronic device into the aperture.

As described above and illustrated in the accompanying figures, the present disclosure discloses systems, methods, and apparatuses for inductive power transmission. A first electronic device may include an inner inductive coil positioned at least partially around a shield core and a second electronic device may include an outer inductive coil positioned around an aperture. The first electronic device may be operable to receive power from and/or transmit power to the second electronic device when a portion of the first electronic device (such as a shaft and/or other configured portion) is inserted into the aperture of the second electronic device, positioning the inner inductive coil within the aperture and within the outer inductive coil. When power is being transmitted between the first and second electronic devices, the shield core may concentrate magnetic flux around the inner inductive coil and/or the outer inductive coil. In some implementations, an outer shield may be positioned at least partially around the outer inductive coil and may also concentrate magnetic flux around the inner inductive coil and/or the outer inductive coil.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

Methods based on techniques described in the present disclosure, such as manufacturing methods, may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A system for inductive power transmission, comprising:
   a first electronic device including an inner inductive coil positioned at least partially around a shield core;
   a second electronic device including an outer inductive coil positioned around an aperture; and
   a charging circuit coupled to a battery in at least one of the first or second electronic devices and configured to receive power from the first or second electronic device when the inner inductive coil is positioned within the aperture;
   wherein:
   the shield core concentrates magnetic flux around the inner inductive coil and the outer inductive coil.

2. The system of claim 1, wherein a surface of the inner inductive coil is positioned adjacent to a surface of the shield core and the shield core includes at least one flange that covers at least one additional surface of the inner inductive coil.

3. The system of claim 1, wherein the inner inductive coil is a receive coil, the outer inductive coil is a transmit coil that generates the magnetic flux, and the shield core collects the magnetic flux.

4. The system of claim 1, wherein the shield core includes at least one cavity that comprises an acoustic port that extends through the shield core.

5. The system of claim 1, wherein the inner inductive coil and the outer inductive coil are configured in complementary shapes.

6. The system of claim 1, wherein the inner inductive coil and the outer inductive coil are both configured in circular shapes.

7. The system of claim 1, wherein the first electronic device is operable to at least one of transmit power from at least one first battery of the first electronic device to at least one second battery of the second electronic device or receive power at the at least one first battery from the at least one second battery when the inner inductive coil is positioned within the aperture.

8. An electronic device, comprising:
   a shield core;
   an inner inductive coil positioned at least partially around the shield core; and
   a charging circuit coupled to a battery configured to receive power from an additional electronic device when the inner inductive coil is positioned within an aperture of the additional electronic device;
   wherein:
   the shield core concentrates magnetic flux around the inner inductive coil and the outer inductive coil.

9. The system of claim 8, wherein the shield core comprises at least a ferrite material.

10. The system of claim 8, wherein the inner inductive coil is embedded within the shield core.

11. The system of claim 8, wherein the at least one cavity comprises an acoustic port that extends through the shield core.

12. An electronic device, comprising:
    an aperture; and
    an outer inductive coil positioned around the aperture; and
    a charging circuit coupled to a battery configured to transmit power to an additional electronic device when the outer inductive coil is positioned around an inner inductive coil of the additional electronic device;
    wherein:
    the inner inductive coil is positioned at least partially around a shield core that concentrates magnetic flux around the inner inductive coil and the outer inductive coil.

13. The system of claim 12, further comprising an outer shield positioned at least partially around the outer inductive coil that concentrates the magnetic flux around the inner inductive coil and the outer inductive coil.

14. The system of claim 13, wherein a surface of the outer inductive coil is positioned adjacent to a surface of the outer shield and the outer shield includes at least one flange that covers at least one additional surface of the outer inductive coil.

15. The system of claim 13, wherein the outer inductive coil is embedded within the outer shield.

16. The system of claim 13, wherein the inner inductive coil is a receive coil, the outer inductive coil is a transmit coil that generates the magnetic flux, and the outer shield guides the magnetic flux toward the receive coil.

17. The system of claim 13, wherein at least one of the shield core or the outer shield mitigate interference by the magnetic flux with at least one electronic component of the first electronic device or the second electronic device.

18. The system of claim 12, wherein the first electronic device includes a shaft configured to be inserted into the aperture and the inner inductive coil is located within the shaft.

19. The system of claim 4, wherein the first electronic device includes at least one electronic component positioned within the at least one cavity.

20. The system of claim 19, wherein the at least one electronic component comprises at least one acoustic component.

* * * * *